(12) United States Patent
Sekhar

(10) Patent No.: US 12,465,887 B2
(45) Date of Patent: Nov. 11, 2025

(54) HIGH TEMPERATURE $CO_2$ STEAM AND $H_2$ REACTIONS FOR ENVIRONMENTAL BENEFITS

(71) Applicant: Jainagesh Sekhar, Cincinnati, OH (US)

(72) Inventor: Jainagesh Sekhar, Cincinnati, OH (US)

(73) Assignee: MHI Health Devices, LLC, Cincinnati, OH (US)

( * ) Notice: Subject to any disclaimer, the term of this patent is extended or adjusted under 35 U.S.C. 154(b) by 849 days.

(21) Appl. No.: 17/108,010

(22) Filed: Dec. 1, 2020

(65) Prior Publication Data

US 2021/0162339 A1 Jun. 3, 2021

Related U.S. Application Data

(60) Provisional application No. 62/969,722, filed on Feb. 4, 2020, provisional application No. 62/942,767, filed on Dec. 3, 2019.

(51) Int. Cl.
*B01D 53/32* (2006.01)
*B01D 53/00* (2006.01)
(Continued)

(52) U.S. Cl.
CPC ............ *B01D 53/32* (2013.01); *B01D 53/005* (2013.01); *C01B 3/323* (2013.01); *C01B 3/346* (2013.01);
(Continued)

(58) Field of Classification Search
CPC ....... B01B 53/32; B01B 53/005; C01B 3/323; C01B 3/346; C01B 2203/0222; C01B 2203/0861; C01B 2203/1223; C01B 2203/1229; C01B 2203/1241; C01B 2203/86; C01B 2203/0238;
(Continued)

(56) References Cited

U.S. PATENT DOCUMENTS 6,816,671 B1 11/2004 Reddy
8,625,403 B2 1/2014 Sun et al.
(Continued)

FOREIGN PATENT DOCUMENTS

WO WO-2014124521 A1 * 8/2014 ............... H05H 1/28

OTHER PUBLICATIONS

Solar Schools: Thermal Energy [online], [capture from Apr. 17, 2024]. Retrieved from the Internet < URL: https://solarschools.net/knowledge-bank/energy/types/thermal#:~:text=Heat%20energy%20is%20another%20name,a%20form%20of%20kinetic%20energy.> (Year: 2024).*
(Continued)

*Primary Examiner* — Smita S Patel
(74) *Attorney, Agent, or Firm* — Michael Connelly

(57) ABSTRACT

Presented are processes for the beneficial conversion of $CO_2$ and other environmentally destructive compounds to their constituent parts by the application of thermal plasma containing activated species whereby the interaction of the plasma with the compounds and reactions of $CO_2$ and $H_2$ generate more environmentally friendly compounds comprising in part oxygen and hydrogen. The thermal plasma may be vibro-shear plasma generated by the superheating of either steam, gas or a combination of both.

4 Claims, 7 Drawing Sheets

(51) Int. Cl.
    *C01B 3/32*         (2006.01)
    *C01B 3/34*         (2006.01)
    *F22G 5/00*        (2006.01)

(52) U.S. Cl.
    CPC .......... *F22G 5/00* (2013.01); *B01D 2259/818* (2013.01); *C01B 2203/0222* (2013.01); *C01B 2203/0861* (2013.01); *C01B 2203/1223* (2013.01); *C01B 2203/1229* (2013.01); *C01B 2203/1241* (2013.01); *C01B 2203/86* (2013.01)

(58) Field of Classification Search
    CPC ....... C01B 2203/061; F22G 5/00; F22G 5/20; B01D 2259/818; B01D 53/32; B01D 53/005; B01D 2257/504; Y02P 20/151; Y02P 30/00
    USPC .......................................................... 252/373
    See application file for complete search history.

(56) References Cited

U.S. PATENT DOCUMENTS

| | | | |
|---|---|---|---|
| 8,895,888 B2 | 11/2014 | Burada | |
| 9,261,273 B2 | 2/2016 | Batt | |
| 9,643,877 B2 | 5/2017 | Sekhar | |
| 10,088,149 B2 | 10/2018 | Vissa | |
| 2002/0151604 A1* | 10/2002 | Detering | B01J 19/26 |
| | | | 518/703 |
| 2013/0264187 A1* | 10/2013 | Yang | B01J 19/126 |
| | | | 204/168 |
| 2016/0340195 A1* | 11/2016 | Kuhl | C10G 2/32 |
| 2017/0347440 A1 | 11/2017 | Sekhar | |

OTHER PUBLICATIONS

Liu et al., CO2 conversion by thermal plasma with carbon as reducing agent: high CO yield and energy efficiency, 2018, Plasma Science and Technology, 21, 012001 (Year: 2019).*

U.S. Department of Energy: DOE Explains . . . Bosons and Fermions [online], [retrieved Dec. 11, 2024]. Retrieved from the internet: < URL: https://www.energy.gov/science/doe-explainsbosons-and-fermions> (Year: 2024).*

Zeng et al., Plasma-Catalytic CO2 Hydrogenation at Low Temperatures, Apr. 2016, IEEE Transactions on Plasma Science, vol. 44, No. 4, 405-411 (Year: 2016).*

* cited by examiner

HIGH TEMPERATURE $CO_2$ STEAM AND $H_2$ REACTIONS FOR ENVIRONMENTAL BENEFITS

CROSS-REFERENCE TO RELATED APPLICATIONS

This application claims the benefit of U.S. provisional applications 62/942,767 filed on Dec. 3, 2019 and 62/969,722 filed on Feb. 4, 2020 the disclosures of which are incorporated by reference herein in their entireties. Also, features of the present application are based upon U.S. Pat. No. 10,088,149, entitled "One Atmosphere Boiler Instant Superheated Steam Apparatus And Method"; U.S. Pat. No. 9,643,877, entitled "Thermal Plasma Treatment Method"; U.S. Pat. No. 9,261,273, entitled "Pressurized Point-of-Use Superheated Steam Generation Apparatus and Method"; U.S. Pat. No. 8,895,888, entitled "Anti-Smudging, Better Gripping, Better Shelf-Life Of Products And Surfaces"; U.S. Pat. No. 8,652,403, entitled "Heating And Sterilizing Apparatus And Method For Using Same"; U.S. Pat. No. 6,816,671, entitled "Mid Temperature Plasma Device" and US patent application; US 2017-0347440, entitled "Industrial Heating Apparatus And Method Employing Fermion And Boson Mutual Cascade Multiplier For Beneficial Material Processing Kinetics" all of which are incorporated by reference in their entireties as well.

BACKGROUND

It is well known that the amount, or concentration of greenhouse gases in the atmosphere, such as $CO_2$, need to be reduced. This can be done, at high temperatures, with a system where thermal plasma (containing ions) generators, fiber free refractories and high temperature steam generators are integrated. Very slow kinetics, low temperature processes, such as obtaining fuel from algae by $CO_2$ absorption, are also being considered, but these will not make a substantial reduction. There exists a need for rapid reduction of these gases. This application presents a process and method where equipment for air-plasma (hot gas with vibrationally energized species that are not fully ionic) and superheated steam generation are integrated to reduce $CO_2$ and produce valuable oxygen and oxygen compounds.

A new plasma conversion method is herein proposed for $CO_2$ transformation into useful products. $CO_2$ may be converted into Syngas with this plasma method. Three major advances over the current technology are contemplated by this method. These are: development of an energy efficient plasma process with high yield; development of a highly tunable and selective process with easy design inputs into the apparatus/equipment; and the provision for ease of scalability from the modular design.

Climate change has become a major world-wide challenge. The $CO_2$ production imbalance is a major part of this issue, leading to increasing global temperatures. Closing the carbon cycle by utilizing excess $CO_2$ is an appropriate intermediate step towards a carbon-free future. Several techniques have already been reported, such as conventional plasma and direct electrochemical conversion of $CO_2$ to useful products. However, none have proven to be reliable or scalable enough. Often the competing reactions limit the conversion yield to single-digit percentages. It has been reported that the conversion to useful products including carbon monoxide (CO), formic acid (HCOOH), methane ($CH_4$) and ethylene ($C_2H_4$) or ethane ($C_2H_6$) is feasible. However high efficiency and adequate selectivity in conversion remain elusive.

Apart from climate considerations, the fact that 5 billion metric tons of $CO_2$ emissions were produced in the United States alone in 2017, the utilization and conversion of $CO_2$ into value-added chemicals, fuels, polymers, building materials, and other carbon-based products represents a key economic opportunity. Thus, $CO_2$ utilization technologies can reduce the overall $CO_2$ emissions and offset $CO_2$ capture costs by generating valuable products. In addition to $CO_2$ emissions from electric power production, industrial $CO_2$ emissions provide an opportunity for utilization of $CO_2$ under different conditions and concentrations. Although society at large is expected to become cost insensitive to the cost of the process, the commercial processes that offer the lowest cost of conversion per unit volume of $CO_2$ will naturally be preferred. The new technology presented in this application will greatly assist the conversion and use challenges, based on the anticipated processing price and scalability.

SUMMARY

In particular, it is known that $6CO_2(g)+6H_2O(g)=C_6H_{12}O_6(\text{Sugar-GAa})+6O_2(g)$ and yields a negative free energy at 1600° C. However, this process has not been considered feasible, as the process temperature is too high. Shown herein is that such temperatures can easily be managed by direct thermal catalysis or aided by activated species from low energy intake plasmas like electroshear plasma. The use and application of more than one type of activated species produced by electroshear and vibroshear plasma (among others) is contemplated. Also described is a method of providing ionic activated catalysts to further reduce the required temperature below 1600° C. This is a high temperature photosynthesis reaction generally that can occur at 1600° C. Proposed is an air catalyst in the form of activated ions that can reduce this temperature below the previously required 1600° C. Fundamentally, by using an activated nitrogen species, one can catalyze the above reaction (when hot $H_2$ is available) in order to reduce atmospheric $CO_2$. Waste to fuel reactions may also be considered and there currently exists a push to make liquid fuels by using a multitude of reactions. The entire focus of these types of reactions has changed because of the $CO_2$ and $CH_4$ green house problems. Eliminating $CO_2$ with high temperature and thermal plasma (ion containing) or energized state gases, reactions with hot activated $CO_2$ and steam will assist $CO_2$ reduction. Additional embodiments of methods concerning hot gases for energy production or $CO_2$ reduction are contemplated and are presented below.

The employed plasma is a wide-area electro-shear-vibratory-thermal plasma which is expected to primarily enhance vibrational excitations in a flowing gas with phonon-boson interactions that produce a stable plasma beam. This type of plasma, due to lack of electrodes in its generation, has the advantage of scalability and of allowing rapid input for sundry part-introduction and change-out. The main benefits of this plasma are wide-area stable plasma conditions including open-plume stable configurations. This plasma has no combustion requirements (thus highly environmentally positive) and offers a clear reduced cost of processing in all configurations (inline or open discharge configurations).

The ionic or highly energized radical character of the plasma beam places it at $10^{21}$ activated species per cubic meter. Additionally, the beam power density of the open plasma beam, assuming just equivalent of 0.1-1% ionization, is $10^6$-$10^9$ W/m$^2$, which is higher than most high-power lasers. A laser beam generally offers only a few mm wide beam, whereas comparatively, the open plasma beams are about 200 mm long with diameters ranging from a few mm to over 400 mm with multiple plasma filaments when required for very wide beams. There is no combustion, microwave or RF that is required. The plasma is produced at about 1 m$^3$ flow of gas per 10-15 KW unit. The velocity is about 1-10 m/s, or in other words 0.02 to 0.2 m$^3$ is produced per second. For air, one mole is 0.0224 m$^3$. Thus, about ~$10^{20}$-$10^{22}$ ions are available per cubic meter. This can be enabled either with a small number of fully dissociated ions or a greater abundance of vibro-shear excited species in order to complete useful reactions. It is anticipated that a hybrid system of RF and electroshear plasma can also be used along with thermal catalysis where required.

An industrial apparatus and method are provided such that fermions may be amplified to produce activated species using low energy, in the order of a few KW. Such apparatus and methods contrast with the megawatt powered units currently used for such emissions in large colliders which are unavailable for use in small industry. With fermions, reactions of the kind, e−+A2−→A*2+e−
e−+A2−→2 A*+e−
e−+A2−→A++A−+e−
e−+A2−→A+2+2e−
e−+A2−→A++A+2 e−
e−+A2−→A−+A* may be achieved, especially catalyzed by bosons and fermions, where e− is a symbol for an active electron, A is a chemical species and A* is an activated species. Thus, by producing activated species (e.g. A*) even in complex combinations of metals, silicides, carbides, nitrides, oxides, oxynitrides, diamonds/carbon, borides, polymers, ceramics, and composites and intermetallics, very rapid kinetics of reactions can be achieved which can transfer recombination and heat differently than standard conduction, convection or mere pure radiation.

The theoretical basis for interaction has been shown in the BCS superconductivity theory. In the BCS (Bardeen, Cooper and Schaffer) theory of superconductivity, coupled pairs of electrons act like bosons and condense into a state which demonstrates zero electrical resistance. Reference is made to Yukikazu Itikawa et al, J. Phys. Chem. Ref. Data, Vol. 35, No. 1, 2006 who calculated that extremely high cross sections could be achieved at low eV if interactions and amplification were allowed. However, it has not been possible prior to this application to make a small kW device with continuous hole cross sections where activated species with extremely hot gasses could be obtained with catalytic employment of stimulated fermions and bosons. Such an apparatus could enhance industrial processes, such as nitriding or oxynitriding, where extremely rapid kinetics could be achieved by transferring heat and activated stimulation to a location which is further away from where they are created. When fermions are involved, it is well known in the chemistry literature that the kinetics of reaction can be greatly enhanced by the use of ions. Such will also lead to more efficient use of energy in fuel cells.

DRAWINGS—FIGURES

Figure 1:
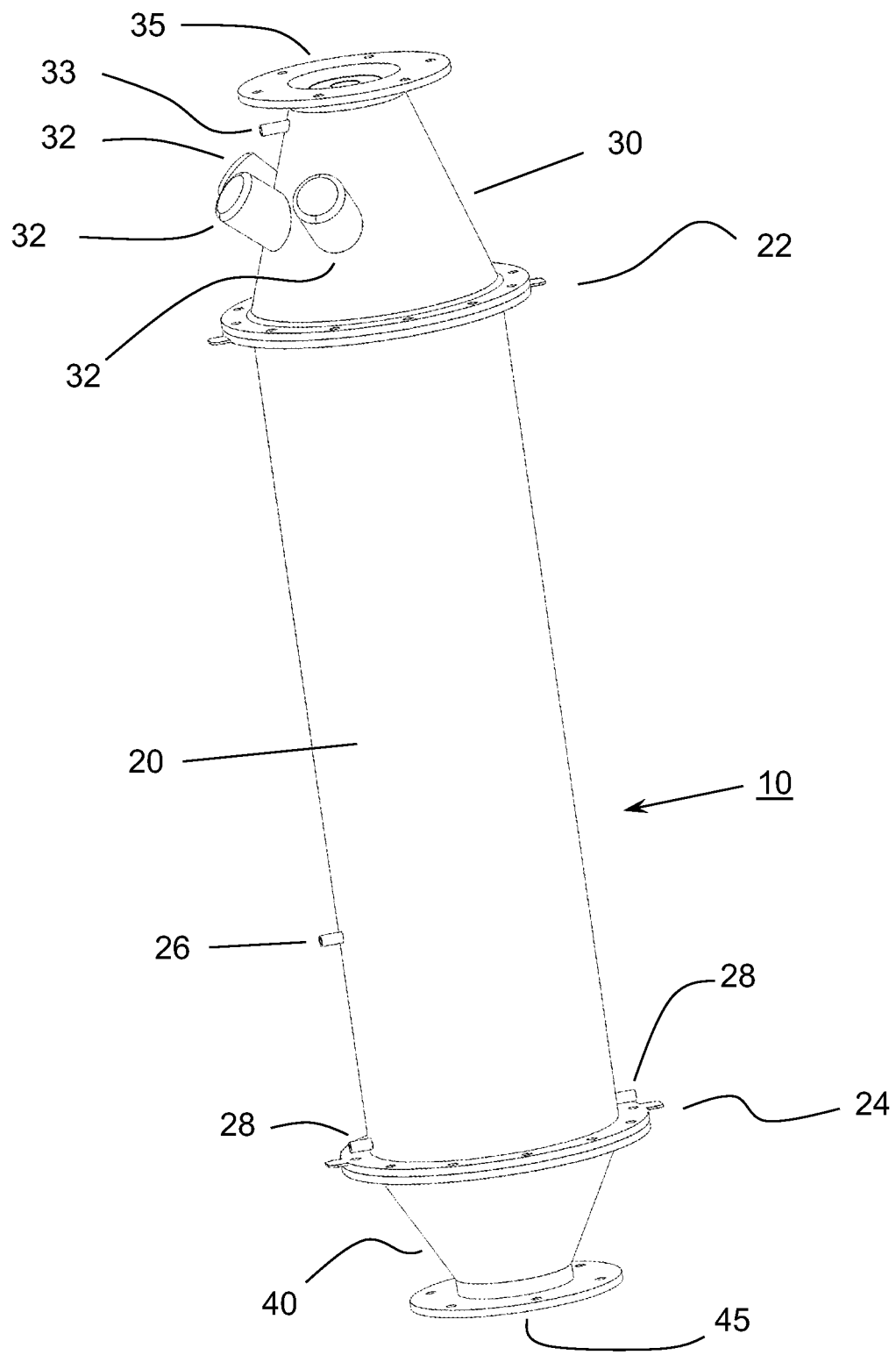
FIG. 1 is an overall view of an embodiment of an industrial heating device for rapid heating and high temperature gradient that introduces fermions and bosons into an adjoining fluid.

DRAWINGS—REFERENCE NUMERALS 10. industrial heating device
20. outer casing
21. casing flange
22. intake end
24. exhaust end
26. mid-casing thermocouple port
28. exhaust thermocouple port
30. intake cap
31. intake cap flange
32. power access port
33. intake thermocouple port
35. intake port
40. exhaust cap
41. exhaust cap flange
45. exhaust port
50. current carrying member
52. strait member segment
54. u-shaped member segment
55. member terminal end
60. refractory core
61. insulative wrap
65. member channels

DESCRIPTION

Chemical and Fuel Production: Many steam reactions are beneficial to energy production and biomass. Super-heated steam offers high kinetics and clean chemistry. Waste-to-fuel conversion, discrete community fuel production and hydrogen supplying are contemplated applications of such reactions. Plastics are hydrocarbons made from petroleum that can be converted back to liquid fuel. For example, pyrolysis could be used to accomplish this. When subjected to high heat and pressure, water breaks down the plastic and converts it into oil. An attractive method of converting these waste materials into useful form is anaerobic digestion with steam heating which produces biogas that may be used as a fuel. Waste can also be converted to methanol and ethanol. Garbage can be converted with the application of thermal plasma to break down organic materials into syngas, which is a mixture of hydrogen and carbon monoxide. Organic waste, via the Fischer-Tropsch reaction, can be converted into fuel as well. A mixture of hydrogen and carbon monoxide, from municipal solid waste and other renewable biomass, can be converted to long-chain hydrocarbon molecules that make up diesel and jet fuels.

Gasification: Gasification is a thermochemical process which results in the conversion of waste materials and takes place in the presence of limited amounts of oxygen. Steam or the oxygen in the air is reacted at high temperature with the available carbon in the waste material to produce gases such as carbon monoxide, hydrogen and methane. Gasification processes produce syngas which is used for generating electrical power. Thermal gasification of the waste materials allows the production of a gaseous fuel that can be easily collected and transported. Gasification typically takes place at temperatures between 750-1100° C.

Pyrolysis: Pyrolysis is also a thermal process similar to gasification which involves the thermal degradation of organic waste in the absence of free oxygen to produce combustible gases. Pyrolysis uses heat to break down organic materials in the absence of oxygen (e.g. with steam heating to 1250° C.). Materials suitable for pyrolysis processing include coal, animal and human waste, food scraps, paper, cardboard, plastics and rubber. The pyrolytic process produces oil which can be used as a synthetic bio-diesel fuel or refined to produce other useful products. Sometimes the byproduct of pyrolysis is a type of fine-grained bio-charcoal called "biochar", which retains most of the carbon and nutrients contained in biomass and may be used as a soil enhancement. During pyrolysis, volatile gases are released from a dry biomass at temperatures ranging up to about 700° C. These gases are non-condensable vapors such as $CH_4$, $CO$, $CO_2$ and $H_2$. Cellulose can break down into char, $H_2O$, $CO_2$ and methane.

Combustion: Municipal and household waste is directly combusted in large waste-to-energy incinerators as a fuel with minimal processing known as mass burning. Combustion can be with a solid, liquid or gas reactant with oxidation. The Boudouard reaction (solid combustion) is stable above 700° C. to eliminate $CO_2$ because $CO_2(g)+C=2CO(g)$. $CO(g)$ above 700° C. can be used as a reductant for oxides as is done for iron oxide reduction.

Digestion: Landfills are the primary method of disposal of municipal solid waste and if left undisturbed, will produces significant amounts of gaseous byproducts, consisting mainly of carbon dioxide and combustible methane ($CH_4$). Such landfill gas or bio-gas is produced by the (oxygen-free) anaerobic digestion of organic matter. In such cases, treatment by steam is often recommended for elimination of certain harmful bacteria. Anaerobic digestion to produce bio-gas can either occur naturally producing a landfill gas, or inside a controlled environment such as a biogas digester. A digester is a warmed, sealed, airless container where bacteria ferment organic material such as liquid and semi-solid slurries, animal wastes and manures in oxygen-free conditions for bio-gas production. An advantage of anaerobic digestion for converting waste to energy fuel is that it employs semi-solid or wet waste. This is normally a small-scale operation. The bio-gas produced can be burned in a conventional gas boiler to produce heat or as fuel in a gas engine to generate electricity or fuel used in some of farm vehicles.

Fermentation: Fermentation uses various microorganisms and yeasts to produce liquid ethanol, a type of alcohol, from biomass and bio-waste materials. The conversion of waste to energy by fermentation requires a series of chemical reactions to produce the ethanol biofuel. Here steam can be directly introduced for rapid kinetics. Multiple reactions occur. The first reaction is called hydrolysis, which converts organic materials into sugars. The sugars can then be fermented to make dilute ethanol, which is then further distilled to produce a bio-fuel ethanol.

Some of the reactions contemplated and their associated applications are:

(1) $2CH_2O(g)+2H_2O(g)=CH_3OH(l)+O_2(g)$ above 1320° C., formaldehyde to methanol.

(2) $CO_2(g)+3H_2(g)=CH_3OH(l)+H_2O(g)$ above 1320° C. methanol by heating syngas or just $CO_2(g)$. Greenhouse gas $CO_2$ can be converted to an alcohol. Waste to fuel reactions can also be considered.

(3) Reactions possible above 1435° C.+$2C+4H_2O(g)=2CH_3OH(l)+O_2(g)$ carbon to methanol (solid to liquid fuel type reaction with hot steam—(Using activated boson and fermion catalysts)).

(4) Photosynthesis: $6CO_2(g)+6H_2O(g)=C_6H_{12}O_6(Sugar-GAa)+6O_2(g)$ (5) Typical high temperature steam i.e., $H_2O(g)$, $CO(g)$ and $CO_2(g)$ reactions for consideration for $CO_2$ removal (one atmosphere) or for making $H_2$ (gas).

(6) $(CH_4(g)+H_2O(g)=CO(g)+3H_2(g)$ steam reforming above 750° C. The opposite direction reaction is sometimes called the Fischer-Tropsch process.

(7) $CO_2(g)+H_2(g)=CO(g)+H_2O(g)$ water shift. Feasible above 820° C.

(8) Combination of greenhouse gases (also called high temperature greenhouse gas reactions): $CO_2(g)+CH_4(g)=2CO(g)+2H_2(g)$ feasible above 650° C. or via the steam reforming and water shift shown above. Again, the products are reducing gases that can be used for various reducing reactions including cleaning and shiny metal production such as $Fe_2O_3+3CO(g)=2Fe+3CO_2(g)$ (weak) or $Fe_2O_3+3H_2(g)=2Fe+3H_2O(g)$ above 515° C. Note also that $CO_2(g)+CH_4(g)=2C+2H_2O(g)$ is always feasible at >100° C. but is extremely weak.

(9) $Fe_2O_3+2CO(g)+H2(g)=2Fe+2CO2(g)+H_2O(g)$ is always feasible but best above 1000° C.

(10) Combination of greenhouse-gases (also called high temperature greenhouse gas reactions): $CO_2(g)+CH_4(g)=2CO(g)+2H_2(g)$ is feasible above 650° C. or via the steam reforming and water shift shown above. Again, the products are reducing gases that can be used for various reducing reactions including cleaning and shiny metal production such as $Fe_2O_3+3CO(g)=2Fe+3CO_2(g)$ (weak) or $Fe_2O_3+3H_2(g)=2Fe+3H_2O(g)$ above 515° C. Note also that $CO_2(g)+CH_4(g)=2C+2H_2O(g)$ is always feasible at >100° C. but is extremely weak. Some of the most potent greenhouse gases such as methane can be converted to non-greenhouse gases $CO$ and $H_2$. These reducing gases can be used for reducing reactions including the reduction of metal oxides. Either the application of superheated steam or thermal plasma (or a combination) may be used. At this point catalysts (activated fermions and bosons) become important. Hot gas with vibrationally energized (activated) species not fully ionic is another form of catalyst and enables a very low cost solution compared to full ionization.

It is contended that the greenhouse gas, methane, can be converted to non-greenhouse gases CO and $H_2$. These reducing gases can be used for reducing some metal oxides. Either a superheated steam generator or thermal plasma generator possibly employing activated bosons and fermions may be used to achieve these reactions. At this point catalysts become important.

Waste to fuel reactions can also be considered and there is a push to make liquid fuels by using a multitude of reactions. The entire focus of these types of reactions has changed because of the $CO_2$ and $CH_4$ green house problems.

Hot $CO_2$ or CO can easily be reacted with azides of Na, Ca, Li etc.) and other reactive compounds to make useful solids or liquids with the oxides of the alkali metal being recoverable. $NaN_2+CO_2$ or Ca—N or Li—N compounds can be reacted with hot $CO_2$, or oxides with hot CO for clean metal production.

For Example

Hot $CO_2(g)+NaN_3=C+NaO_2+1.5N_2(g)$ and results in negative free energy and good kinetics at 980° C.

Similarly, $Fe_2O_3$+hot CO(g) can yield clean Fe.

Devices contemplated for the heating of such reactions above include a simple, but highly energy efficient industrial heating device and method for rapid heating and high temperature gradient production whereby fermions and bosons are introduced into an adjoining fluid which may be boundary layered and consequently produce an amplifiable activated condition even at room pressure and high temperature. This heating device uses a comparatively long current carrying member which may have some curvature with penetration of the current carrying members into spaces that could have any cross-sectional geometry in a high temperature resistant stable material as presented in US 2017-0347440 A1.

A possible means for the application of plasma consists of a method for the rapid thermal treatment of surfaces in a non-vacuum environment comprising generating a thermal plasma plume through the heating of a gaseous flow, placing of the surfaces in the thermal plasma plume, applying thermal plasma to the surfaces and encasing the surfaces with a wrapping material during the applying of the thermal plasma, whereby the surfaces under the wrapping material experience a rapid heat-up (U.S. Pat. No. 9,643,877). Other applications contemplate immersion in a plasma plume where the surface is not encased in a wrapping material.

Superheated steam generators for the heating of the above reactions to temperatures over 1500° C. are contemplated as well, including: An apparatus and method for the instant generation of superheated steam at normal atmospheric pressure with such an apparatus includes a water source, a means to convert the water to a mist or atomized droplets and a means to superheat the mist for application onto surfaces and objects.

Thermal plasma and superheated steam may be applied together to attain a temperature of over 1500° C. by the use of a device to provide improved anti-smudging, better gripping and longer shelf-life to products and surfaces includes an electric superheated steam generator and an electric low-ion plasma generator to provide superheated steam and low-ion plasma to the surfaces of products including plastics. The superheated steam and low-ion plasma may be applied individually, simultaneously or sequentially (U.S. Pat. No. 8,895,888).

The above method and apparatus include features from the following patents and patent applications: (US 2017-0347440), "Industrial Heating Apparatus and Method Employing Fermion and Boson Mutual Cascade Multiplier for Beneficial Material Processing Kinetics"; (U.S. Pat. No. 10,088,149), "One Atmosphere Boiler Instant Superheated Steam Apparatus and Method"; (U.S. Pat. No. 9,643,877), "Thermal Plasma Treatment Method"; (U.S. Pat. No. 9,261,273), "Pressurized Point-of-Use Superheated Steam Generation Apparatus and Method"; (U.S. Pat. No. 8,895,888), "Anti-Smudging, Better Gripping, Better Shelf-Life of Products and Surfaces"; (U.S. Pat. No. 8,652,403), "Heating and Sterilizing Apparatus and Method for Using Same"; (U.S. Pat. No. 8,435,459), "Heating and Sterilizing Apparatus and Method of Using Same"; (U.S. Pat. No. 6,816,671), "Mid Temperature Plasma Device" all of which are incorporated by reference in their entireties.

DETAILED DESCRIPTION $CO_2$ Conversion Employing Activated Species or Radicals Embodiment Plasma technologies have many advantages over traditional $CO_2$ conversion pathways and may provide a unique and economical process for the utilization of anthropogenic $CO_2$. Plasma technologies provide gas activation by energetic electrons instead of heat, allowing thermodynamically difficult reactions, such as $CO_2$ splitting, to occur with reasonable energy costs. Plasma technologies can also be easily switched on and off which is compatible with intermittent renewable energy and load-following applications. The most common types of plasma reported in the literature are dielectric barrier discharges (DBDs), microwave (MW), and gliding arc (GA); however, other types, such as radiofrequency, corona, glow, spark, and pulsed electron beam (PEB), have also been studied. Depending on the type of plasma, different $CO_2$ conversions and energy efficacies have been reported. In terms of energy efficiency, a target of at least 60 percent energy efficiency has been suggested for plasma $CO_2$ conversion to be competitive with other technologies. Plasma tends to be very reactive and not selective in the production of targeted compounds. Therefore, plasma $CO_2$ conversion technologies may need a catalyst to increase selectivity and produce targeted compounds. Low conversion of $CO_2$ could also require postreaction separation of the products from the reactants and may be cost prohibitive. methods are sought to convert $CO_2$ to high value chemicals or fuels using plasma technologies in an economically viable process, overcoming challenges associated with energy efficiency, $CO_2$ conversion and selectivity.

It has been found that a simple but highly energy efficient device is possible for the rapid heating and a high temperature gradient which introduces fermions and bosons into an adjoining fluid and one which could be boundary layered and consequently produce an amplifiable activated condition even at room pressure and high temperature. This is a wholly unanticipated and unexpected finding, and, although the comprehensive theoretical basis is not completely understood, it has been found that an unusual rapid heating can be created, as well as, transferred surface activation by using a comparatively long order of 10-100 cm current carrying member with none, or some curvature (radius of curvature exceeding 0.5 meter), and >100 amps current with penetration of the current carrying members into spaces that could have any cross sectional geometry (e.g. circular holes, ellipsoids or square cross section) in a high temperature resistant stable material. The holes are expected to have a diameter in the range of millimeters to tens of millimeters.

In one embodiment, the apparatus consists of long current carrying members connected by a plurality of holes. In such an apparatus, extremely hot temperatures are achieved. The holes may be from 0.1 mm to 100 mm in diameter. Currents passing through the current carrying members may range from 80 to 350 amps. Voltages, unlike those used in plasma devices, can be small with frequencies remaining in the Hz range when AC current is used. Unique reactions of the type $19Fe+4N(g)+O(g)+3H_2O(g)=Fe_3O_4+4Fe_4N+3H_2(g)$ can easily be catalyzed or enabled by key fermions and bosons and actuated species. Cavitation and pressure differentials promote fermions and are additionally stimulated by bosons.

In another embodiment, the channels or holes through which the current carrying members are between 6-12 mm in diameter. These channels may be surrounded by a series of smaller channels or holes at around 1 mm in diameter. The smaller channels may differ in size and in cross-sectional shape from each other. The smaller holes may be arranged symmetrically or asymmetrically around the current carrying member channels and may follow the path of the member channels in a parallel, or near parallel, manner. Such smaller channels assist in the production of greater output temperatures for the device.

Another embodiment of the device has current carrying members or elements bent in elongated u-shapes. A continuous element bent in such a u-shaped configuration may pass through channels or holes in a refractory or other material. Separate u-shaped current carrying members are anticipated as well, which may each, individually, be connected to a power source. The long strait segments of the elements run through these channels while the curved or u-shaped segments are outside of the refractory. A current is passed through the element thus producing heat. A gas is projected through the refractory, which is porous, along the direction of the long strait segments of the element. The gas is heated in this manner producing a plasma which is projected out of the device. The device may be encased in a shell consisting of appropriate material. As stated above, smaller parallel channels may be symmetrically positioned around the element channel. Both symmetric, non-symmetric and combinations are anticipated. Coils, u-shapes, sheet and other geometries of current carrying members are fully anticipated. Elements with a radius of curvature in the range of approximately 1 to 25 millimeters are contemplated.

Figure 2:
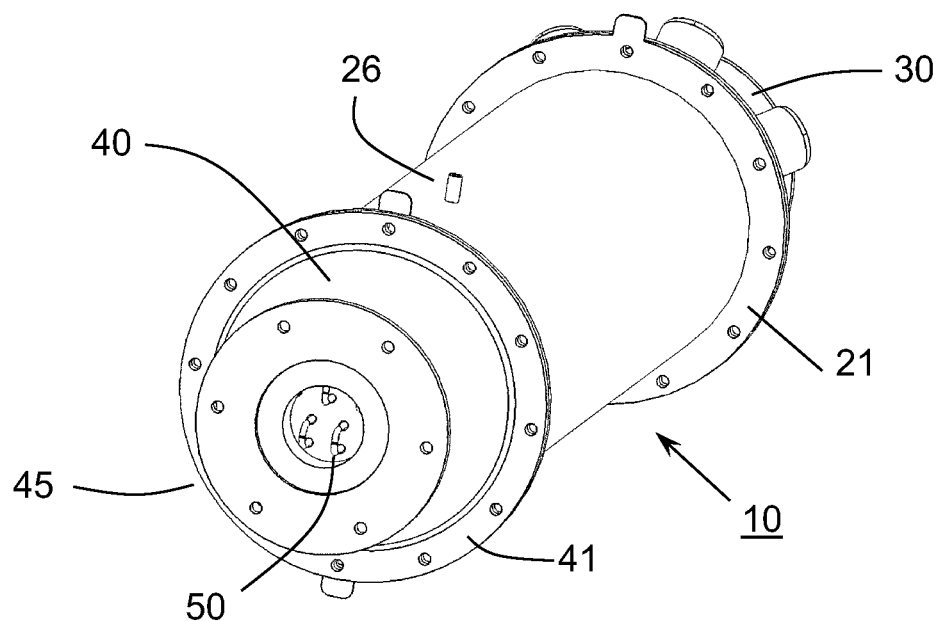
FIG. 2 is a view of the exhaust end of an embodiment of the heating device.
Figure 3:
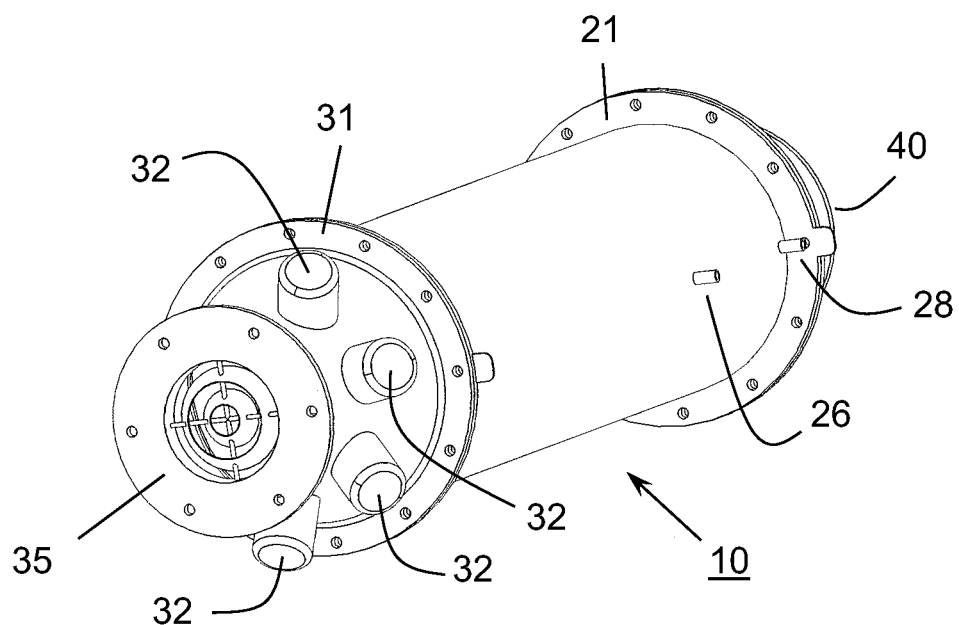
FIG. 3 is a view of the intake end of an embodiment of the heating device.
Figure 4:
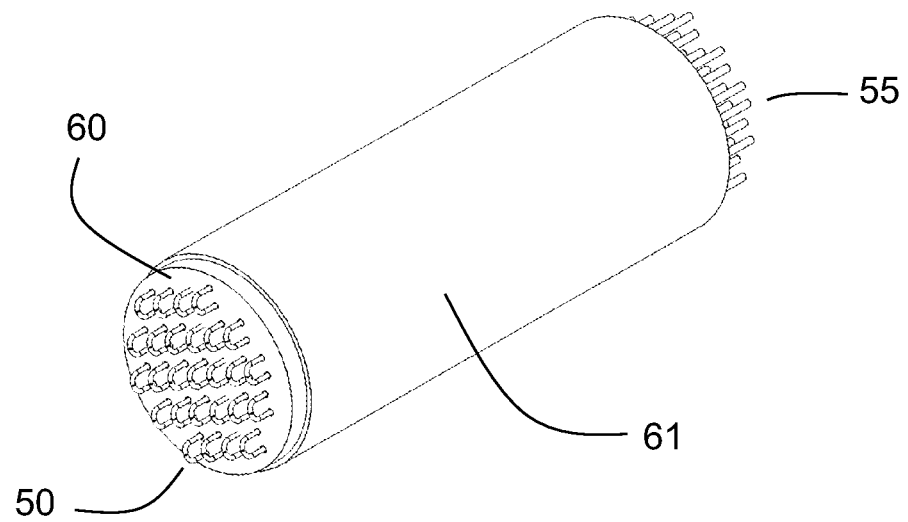
FIG. 4 is a view of the electrically powered heating elements of an embodiment of the industrial heating device positioned within channels through a porous ceramic contained within the outer casing of the device.
Figure 5:
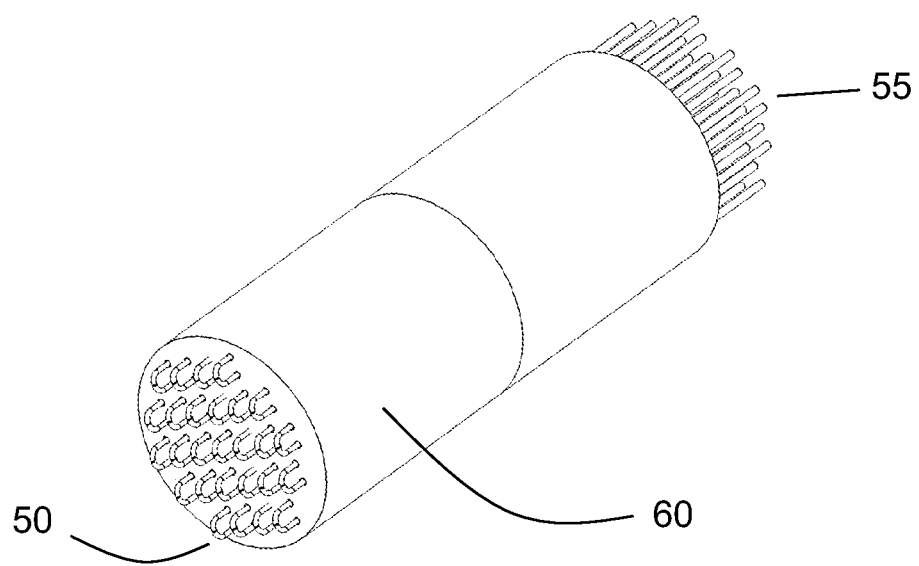
FIG. 5 is a further view of the electrically powered heating elements of an embodiment of the industrial heating device positioned within channels through a porous ceramic contained within the outer casing of the device.
Figure 6:
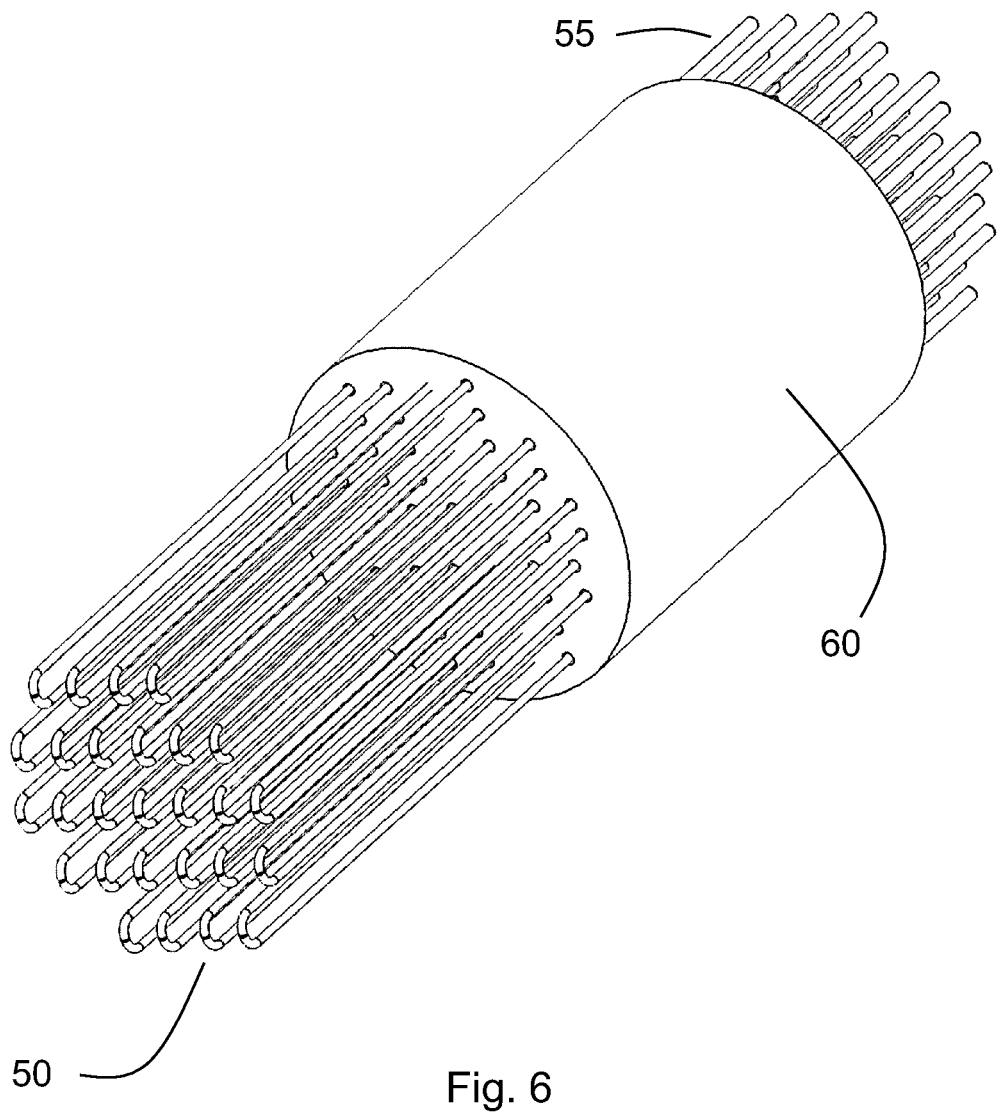
FIG. 6 is a cut-away view of the porous ceramic of the heating device revealing the heating elements passing through the channels of the ceramic.
Figure 7:
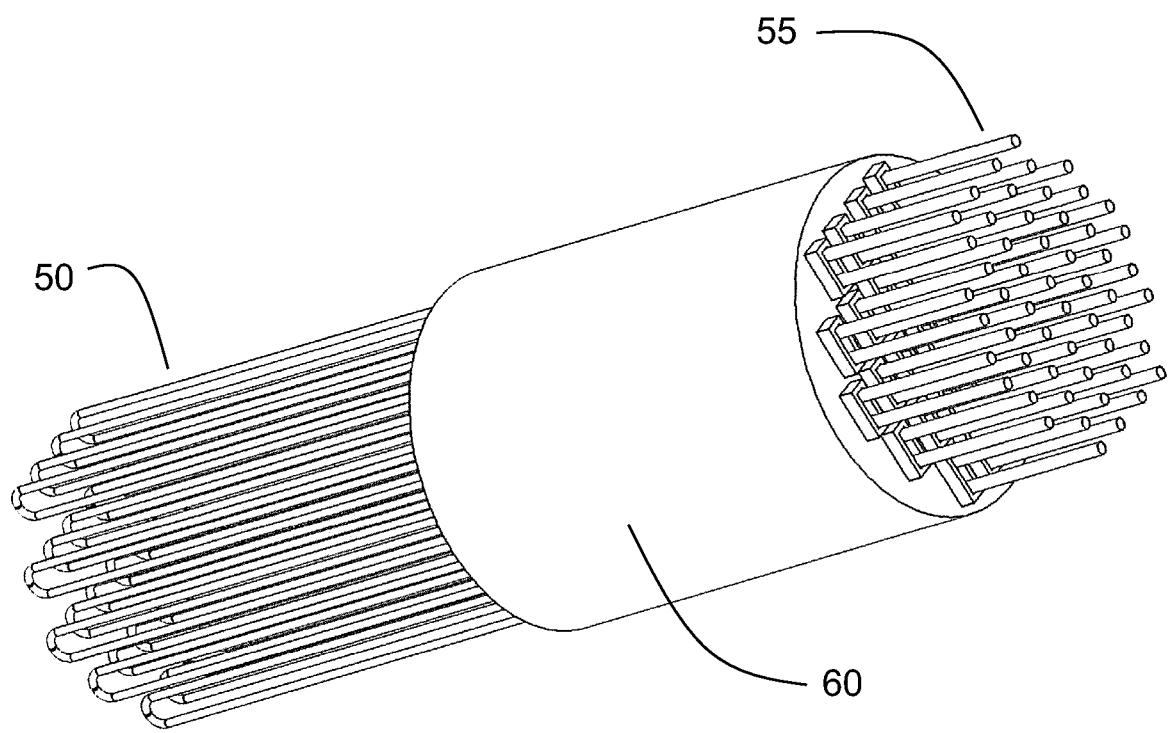
FIG. 7 is a further cut-away view of the porous ceramic of the heating device revealing the heating elements from the terminal ends of the heating elements.
Figure 8:
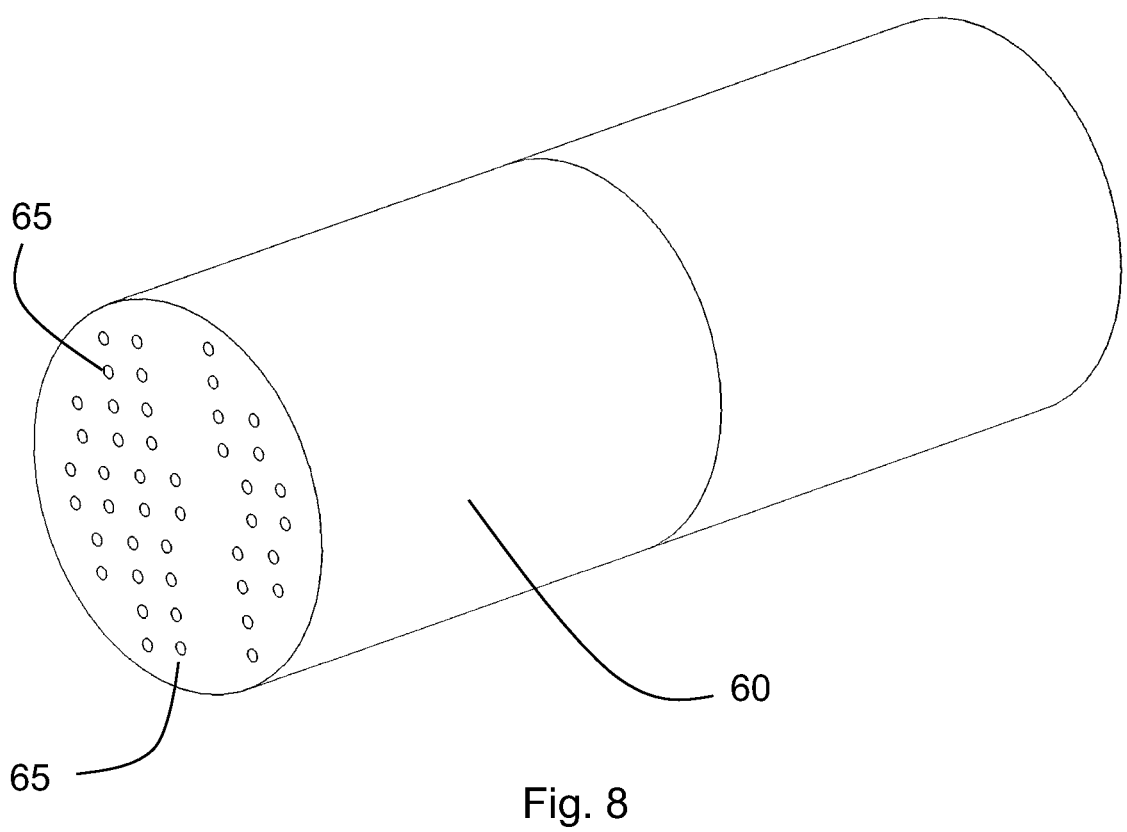
FIG. 8 is an end view of the porous ceramic showing the exit holes of the channels in which the heating elements are positioned.
Figure 9:
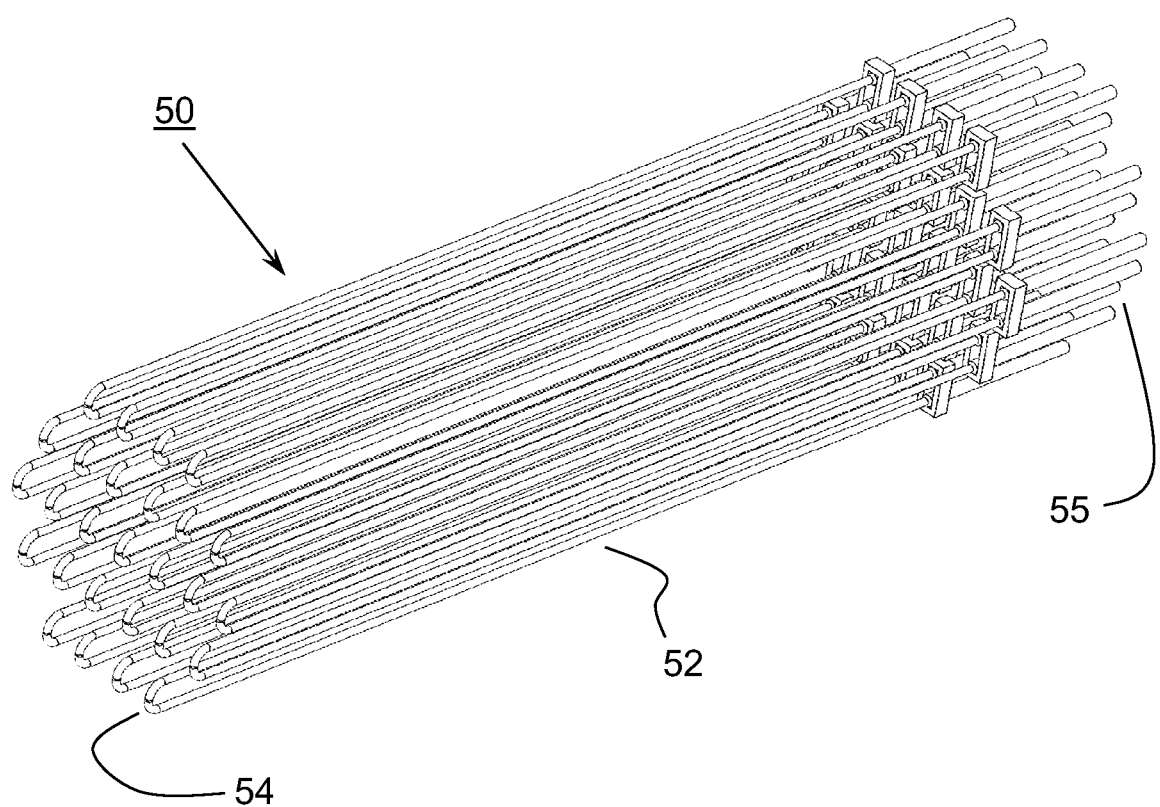
FIG. 9 is a view of the heating elements of the industrial heating device.

A preferred embodiment of the device for rapid heating of a gaseous multi-species fermion and boson containing flow is depicted in FIGS. 1-9. The industrial heating device 10 comprises an outer casing 20, constructed of suitable high temperature resistant materials, having an intake end 22 and an exhaust end 24. The intake end 22 is fitted with an intake cap 30 which has an intake port 35 positioned and designed to allow the introduction of a gaseous flow into the casing 20. A means to project the gaseous flow would be located at the intake cap 30 and in communication with the intake port 35. The intake cap 30 may have one or more power access ports 32 which allow access into the intake cap 30 for electrical. control and any other necessary connections. The intake cap 30 is equipped with an intake thermocouple port 33 to measure the temperature of incoming gas. A mid-casing thermocouple port 26 and at least one exhaust thermocouple port 28 are positioned on the casing 20 allowing for temperature readings within the heating device 10. The casing 20 is also fitted with an exhaust cap 40 with an exhaust port 45 attached at the exhaust end 24 of the casing 20. In this embodiment, the casing 20 is round in cross section with an elongated strait configuration resulting in a cylindrical appearance, but other geometries are contemplated. The casing 20 may have a casing flange 21 on each end that mate up with a corresponding intake cap flange 31 and exhaust cap flange 41. Suitable gasket material may be positioned between the flanges which are attached with bolts (not pictured).

A high temperature resistant ceramic, refractory or other suitable material is positioned inside of the casing 20. The intake cap 30 and the exhaust cap 40 may also be lined with a ceramic material. In this embodiment, the ceramic material is comprised of a refractory core 60 inside of an insulative wrap 61. The refractory core 60 extends, in an uninterrupted manner, the length of the casing 20 and has at least one channel 65 cut or formed through the length of the core 60 parallel to the elongated strait dimension of the casing 20. The channels 65 are sized to accept current carrying members 55. The diameters of the channels 65 and the members 55 are designed to allow the gaseous flow to be directed through the channels 65 axially along the length of, and in contact with, the members 55. Further channels may be included through the length of the core 60 to allow extra flow of the gas. The core 60 material may be porous to permit even more gaseous flow to the exhaust end 24 of the casing 20. The core 60 may be in one piece or in multiple sections abutted together and may be covered with a insulative wrap 61.

In the present embodiment of the heating device 10 the current carrying members 50 are each configured to have two long strait member segments 52 connected by one u-shaped member segment 54. Axial flow along the length of the elements is noted to be better than cross-flow (flow across the elements). The long strait segments 52 may also be connected with a twist rather than a u-shaped segment 54. Each strait segment 52 has a terminal end 55 attached by which a power source is electrically connected to the elements 50. At least one element 50 will be fitted within the core 60. The long strait segments 52 are each individually inserted into an uninterrupted channel 65 in the core 60. The strait segments 52 are encased in the core 60 along their entire lengths with no gaps in the core 60 and in this manner are the channels 65 and core 60 are uninterrupted along their lengths. However, the u-shaped segment 54 attaching the two strait segments 52 for each current carrying member 50 is positioned out side of the core 60 and the channels 65 (FIGS. 4-7) at the exhaust end 24 of the casing 20. The terminal ends 55 of the members 50 project out at the intake end 22 of the core 60. The strait segments 52 are held snugly within the channels 65, but there is enough clearance for the gaseous flow to travel through the channels 65 while making direct contact with the members 50. Heat is thus transferred from the current carrying members 50 to the flow. Parallel channels and porosity in the core material also allow gaseous flow and heat transfer from the members 50 and the core 60 to the gaseous flow.

Operation

In operation, a gaseous multi-species fermion and boson containing flow is forced by a means of projection into the intake end 22 of the heating device 10. As stated, the means of forcing the gaseous flow into the heating device 10 may be a fan, compression or other instrumentalities. The gaseous flow is pushed through a block or core 60 of high temperature resistant material having channels 65 or grooves cut into the core 60. The channels 65 contain current carrying members 50 which are connected to a power source allowing the members 65 to be electrically charged to produce a desired heat. The gaseous flow is driven through the channels 65 by, and in contact with, the heated members 50 thereby picking up heat from the channels and the core 60 material. The flow is to be along the long axis of the current carrying members 50 and not across this axis. The core 60 may also have parallel channels not containing heating elements and may be porous thus allowing more pathways for the gaseous flow to travel through the core 60. The porosity of the core 60 material may be interconnected and provides a tortuous path for the gas to follow allowing for greater heat transfer from the elements to the core 60 material and ultimately to the gaseous flow. Contact with the heated members 50 and the heated core 60 material and the extended dwell time in the cores 60 channels and porosity allow for an efficient and large transfer of heat to the gaseous flow. The flow is constricted in the channels and porosity and is in constant contact with heated members and/or core 60 material from the intake end to the exhaust end of the core 60. The gas flow may show electrical conductivity because of the fermions such as electrons. However, the electrical resistance will be measured in mega-ohms.

Key Reactions for this Embodiment

When it is shown that this process offers acceptable cost for $CO_2$ conversion, then a wide range of potential industrial applications of the decomposition, such as treatment of waste, power plant exhausts that can lead to the synthesis of new materials including transportation fuels, will become feasible. $CO_2$ conversion is an endothermic process. The main endothermic chemical processes of interest for carbon dioxide or assisted carbon dioxide decomposition (dry reforming of methane DMR reaction) can be presented by the reactions:

$$CO_2 \rightarrow CO + \tfrac{1}{2}O_2, \Delta H = 2.9 \text{ eV/molecule.} \tag{R1}$$

$$CH_4(g) + CO_2(g) \rightarrow 2CO(g) + 2H_2(g) \Delta H° = 2.55 \text{ eV/molecule} \tag{R2}$$

$$2CH_4(g) + CO_2(g) + 0.5O_2(g) \rightarrow 3CO(g) + 4H_2(g) + \Delta G = 0 @ 280° \text{ C.} \tag{R3}$$

Note that reactions R1 to R3 show an increase in entropy when converted, thus overcoming the endothermic barrier which should be enough to enable the reactions. Several of these reactions are possible at very high temperatures, however the possibilities of carrying them out at a lower temperature with either solid or plasma catalysts offers a cost reduction possibility. In this application, task one is directed towards plasma decomposition of reaction (R1) and task two towards a combination of plasma and solid catalysts for reactions (R2), but with an additional reaction (R4) that may be included in the method, namely:

$$2CH_4(g) + CO_2(g) + O^*(g) \rightarrow 3CO(g) + 4H_2(g) \Delta G = 0 \text{ even at room temperature} \tag{R4}$$

With O* (activated species or radical) from plasma reaction R1 the $3CO(g) + 4H_2(g)$ ratioed syngas is immediately feasible. This implies no further energy input is required downstream. $\Delta G = 0$, even at room temperature, and remains negative as the temperature increases. Therefore, if R1 is proven with a high efficiency adjustments can be made to get 100% yield of the syngas by manipulating the sequence of sub reactions with positioning the inlet or temperatures.

Energy Efficiency and the Yield Landscape with Known Plasma Methods

Plasma processes accelerate dissociation with vibrational and ionization excitations. The plasma to be employed for the anticipated processes is an electro-shear-thermal plasma which is expected to primarily enhance vibrational excitations with phonon-boson interactions. The generating unit produces strong plasma plumes (a feature of vibro-ionizable plasmas) for Air, $CO_2$, $N_2$, $N_2$—$H_2$ and Steam. This type of plasma has also shown potential for use in plasma-nitriding applications. A reasonably high energy efficiency for reaction (R1) has been observed by plasma dissociation. The process efficiency η, of the process for reaction (R1), is the ratio of the dissociation enthalpy $\Delta H = 2.9$ eV/molecule to the actual specific energy requirement (called SER or total energy cost) to produce one molecule of CO in the plasma system i.e., $\eta = \Delta H / SER$. The best η results, to date, appear to have been achieved in experiments with RF and microwave discharges at low pressure. A value of 60% energy efficiency has been achieved in non-equilibrium RF discharge at reduced pressure and with the GAP (gliding arc plasma). Notably, the cost of processing is not well reported. An average transferred arc plasma operates at about 20% efficiency which is low compared to simple heating to get a high η. Regardless, performing the process in subsonic flow has led to reports of energy efficiencies at 80%. In very costly supersonic flows, the energy efficiencies have reportedly reached 90%.

The reaction sequences for thermally excited but not fully ionized plasmas are known only in a speculative manner. The specific energy per molecule for the best conversion efficiency for reaction (R1) and the energy efficiencies at any conversion efficiency, is over several tests. When the temperature reaches the level that is high enough to support chemical reactions in a system (one can think of this as a sustainable ignition temperature), chemical reactions produce high concentrations of excited molecules, that could form a basis for stepwise ionization. This results in a significant drop in the energy necessary to support electric discharge in the system for two reasons. First, stepwise ionization that requires relatively low electron energy overcomes the requirement for complete direct ionization. Ionization is typical for low-temperature non-equilibrium plasmas requiring much higher ionization energy. Second, the high temperature of surrounding gas reduces heat losses from the discharge channel, whereas a significant portion of the discharge energy in semi-warm plasma systems should be spent to compensate these losses. Thus, an intensive chemical reaction, e.g. combustion, supports the existence of a warm electric discharge. However, another possibility to reduce SER can be realized in a process, in which a charged particle before recombination transfers virtually all the energy obtained from the electric field to a very efficient chemical channel. A unique example of such an efficient chemical channel is a class of reactions stimulated by a vibrational excitation of molecules.

Thus, this mechanism can be thought to possibly provide the highest energy efficiency of endothermic plasma-chemical reactions under non-equilibrium conditions because of the following four factors when discussing drawbacks to conventional and GAP plasmas. (1) The major fraction (70-95%) of discharge power in many molecular gases (including $N_2$, $H_2$, CO, $CO_2$, etc.) that happens at the electron temperature $T_e \approx 1$ eV can be transferred from plasma electrons to the vibrational excitation of molecules. (2) The rate of vibrational-translational (VT) relaxation is usually low, at low gas temperatures, thus spending most of the vibrational energy on stimulation of chemical reactions. (3) The vibrational energy of molecules is the most effective for stimulation of endothermic chemical processes. (4) The vibrational energy necessary for an endothermic reaction is usually equal to the activation barrier of the reaction and is significantly smaller than the energy threshold of the corresponding electronic excitation processes.

A good example of reduction to hydrogen is, therefore, now recognized, but it is not yet clear for $CO_2$ dissociation. As an example, note that the dissociation of $H_2$ through ionic processes requires 4.4 eV. On the other hand, dissociation of $H_2$ with plasma can be done at ~1-2 eV. Regardless, previous investigations have indicated that stimulation of vibrational excitation of $CO_2$ molecules is the most effective route for $CO_2$ dissociation in plasma. It is also well known that vibrational energy losses through vibrational-translational (VT) relaxation are relatively slow for $CO_2$ molecules thus it is possible that the CO conversion is selectively enabled. Thus, there is a fair expectation that the vibro-shear plasma should be studied particularly as it has shown potential for large scale plasma-nitriding and aluminum dross reduction.

Importance of Selectivity

The combined conversion of $CO_2$ and $CH_4$, known as the dry reforming of methane (DMR), is analogous to the steam reforming of methane (SMR: Steam Methane Reforming and Methanol Synthesis: $CH_4+H_2O \rightarrow CH_3OH+H_2+122.0$ kJ/mole), indicating the replacement of water by carbon dioxide. The DMR process is, however, not as straightforward as the steam reforming of methane, because $CO_2$ is a highly oxidized, thermodynamically stable molecule, while its reaction partner, $CH_4$, is chemically inert. Hence, the process needs to be carried out at high temperatures (900-1200° K) in the presence of a catalyst, typically containing Ni, Nickel Ferrite, Co, precious metals or $Mo_2C$ as the active phase. At 1500° K, complete conversion is achieved, with an energy efficiency of 60%. However, the maximum energy efficiency of 70% is obtained before this at 1000° K, reaching a conversion of maximum of 83%, but this then decreases with increasing the temperature.

The DMR reaction was first studied by Fischer and Tropsch in 1928, and since has been a challenge for chemical engineering ever since. With the beginning of a new millennium and the increasing concern regarding climate change, DRM was a way to convert the major greenhouse gas $CO_2$ into useful products with the aid of natural gas. To date, a true mixture of environmental and economical motivations are seen that include (i) the conversion of the greenhouse gas $CO_2$, (ii) the capability of using biogas as a feedstock, and (iii) the search for a convenient way to liquefy $CH_4$ for easier transport, and the availability of cheap $CH_4$ through shale gas. There is one major pitfall, namely, the inherent susceptibility for soot deposition and the detrimental effect this has on the process through deactivation of the usable catalyst. Due to this drawback, DRM is to date not yet (widely) used on an industrial scale. Nevertheless, the inability to transform the alluring promises of DRM into reality through the traditional thermal methods, among other reasons, has sparked and fueled the growing interest for alternative reforming technologies and may prove to be more applicable for $CO_2$ utilizations technologies. Potentially large benefits and volarization could arise from a continuous but two-step linear process where:

$$CO_2(g) \rightarrow CO(g)+0.5O_2(g) \text{ leading to}$$

$$2CH_4(g)+CO_2(g)+0.5O_2(g) \rightarrow 3CO(g)+4H_2(g) \Delta G=0 \text{ at } 280° C.$$

It is well known that various combinations if $CO/H_2$ are suitable for different end products thus removing the need for additional separation sequences. Based on the literature it is now thought that this versatile plasma could be exactly what could assist $CO_2$ conversion technologies.

More Product Reactions $$CO_2+C==>>2CO$$

Carbon monoxide acts as a reducing agent and reacts with iron ore to give molten iron, which trickles to the bottom of the furnace where it is collected.

$$Fe_2O_3+3CO==>>2Fe+3CO_2$$

The limestone in the furnace decomposes, forming calcium oxide. This is a fluxing agent and combines with impurities to make slag, which floats on top of the molten iron and can be removed.

$$CaO+SiO_2==>>CaSiO_3$$

$1.5H_2(g)+1.5CO(g)+Fe_2O_3=2Fe+1.5H_2O(g)+1.5CO_2(g)$: Feasible above 300° C. Good at 600°. Now recycle the $CO_2$.

$2H_2(g)+2CO(g)+Fe_3O_4=3Fe+2H_2O(g)+2CO_2(g)$: Not feasible.

$H_2(g)+CO(g)+2FeO=2Fe+H_2O(g)+CO_2(g)$: Not feasible.

$FeO+CO(g)=Fe+CO_2(g)$: Negative free energy up to 500° C. Not reduced by $H_2$ $Fe_2O_3+3CO(g)=2Fe+3CO_2(g)$: Negative free energy reduced by $H_2$ above 600° C.

$Fe_3O_4+4CO(g)=3Fe+4CO_2(g)$: Negative free energy up to 500° C. Not reduced by $H_2$.

$Fe_2O_3+2CO(g)+H_2(g)=2Fe+3CO_2(g)+H_2O(g)$ at 600° C. DG=−26.46 KJ/mol=−0.2 eV/molecule: (reaction is mildly exothermic).

$CO(g)+2H_2(g)=CH_3OH(g)$: Negative free energy to 100° C.

Plasma Valorization of $CO_2$ and $CH_4$

Plasma coupling of $CO_2$ using $CH_4$ as a reducing co-reactant has been reported for a variety of plasma systems. Many value-added products, such as methanol, ethanol, and various carboxylic acids like formic, acetic, and propanoic acids, have been identified as feasible liquid products. Among those gaseous products, syngas (primarily CO and $H_2$) was reported as the prominent products. In addition, catalysts have been frequently reported showing beneficial effects in plasma catalytic transformation of $CH_4$ and $CO_2$ mixture and a common strategy is to use catalysts that are compatible for conventional thermal catalysis.

Depending on their respective dissociation rate, $CO_2$ and $CH_4$ may exhibit distinctive capability in producing reactive species.

Since Cu, Ni, $MoSi_2$, Co, Nickel Ferrite and Mo-based catalysts have been widely used in thermal catalytic conversion of $CO_2$ and/or $CH_4$ into valuable products like $CH_3OH$. Copper is anticipated to adsorb $CO_2$ as COO species on its surface, which will then reduce to a crucial intermediate HCOO. This is an important advantage of Cu in the plasma catalytic conversion $CO_2$ into alcohols.

Plasma Valorization of $CO_2$ in the Presence of $H_2$

Different from $CH_4$, $H_2$ is frequently employed as a reducing reagent in chemical industry. It has been reported that plasma conversion of $CO_2$ to syngas could be achieved with the co-introduction of $H_2$.

A broad spectrum of materials have already been investigated for the plasma-catalytic DRM, of which Ni is by far the most commonly used active phase, such as in Ni/$\gamma$-$Al_2O_3$, Ni/SiO, Ni—Fe/$\gamma$ $Al_2O_3$, Ni—Fe/$SiO_2$, Ni—Cu/$\gamma$-$Al_2O_3$, $Ni^0$/$La_2O_3$; Ni/MgO, Ni/$TiO_2$, $NiFe_2O_4$, $NiFe_2O_4$#$SiO_2$, $LaNiO_3$/$SiO_2$, $LaNiO_3$ and $LaNiO_3$@$SiO_2$. Furthermore, alumina is the most commonly used support, i.e. in Ni/$\gamma$-$Al_2O_3$, Ni—Fe/$\gamma$-$Al_2O_3$, Mn/$\gamma$-$Al_2O_3$, Cu/$\gamma$-

$Al_2O_3$, $Co/\gamma$-$Al_2O_3$, $La_2O_3/\gamma$-$Al_2O_3$, $Ag/\gamma$-$Al_2O_3$, $Pd/\gamma$-$Al_2O_3$, $Fe/\gamma$-$Al_2O_3$ and $Cu$—$Ni/\gamma$-$Al_2O_3$, or even in its pure form.

Many other catalytic systems are based on zeolites, e.g. 3A, A4, NaX, NaY and Na-ZSM-5. Besides, studies have also been conducted using $BaTiO_3$, a mixture of $BaTiO_3$ and $NiSiO_2$, ceramic foams (92% $Al_2O_3$, 8% $SiO_2$) coated with Rh, Ni or NiCa, quartz wool, glass beads, a stainless steel mesh, starch, BZT ($BaZr_{0.75}T_{0.25}O_3$) and BFN ($BaFe_{0.5}Nb_{0.5}O_3$). For a regular AC-packed DBD, the best result was obtained for the Zeolite Na-ZSM-5, with a total conversion of 37% and an energy cost of 24 eV per converted molecule. As for pure $CO_2$ splitting, the addition of a catalyst does not seem to make the process more energy efficient, but it does yield higher conversions at the same energy cost. The best overall results in a packed-bed DBD were obtained for a quasi-pulsed DBD packed with BFN and BZN, with total conversions in the range of 45-60% and an energy cost in the range of 13-16 eV per converted molecule, which is lower than that for a DBD without packing, but this might also be due to the pulsed operation. Syngas is considered a renewable fuel since its origins mainly come from biological materials such as organic waste. Putting a carbonic waste stream through syngas synthesis converts waste to power through combustion. Benefits include renewable power, reduction of carbon emissions, problematic wastes to usable fuel, and onsite power production. A method for the plasma valorization of a $CO_2$ compound comprising immersing the $CO_2$ compound in a thermal plasma plume and introducing a reducing reagent resulting in the generation of non-$CO_2$ compounds is contemplated as well.

Besides the experimental work, major insights have been obtained in recent years based on modelling of the DRM process for a DBD. Different kinds of models and computational techniques have been successfully developed, including semi-empirical kinetic models, zero-dimensional chemical kinetic models with both simplified and extensive chemistry sets, a one-dimensional fluid model, a so-called 3D Incompressible Navier-Stokes model combined with a convection-diffusion model, a hybrid artificial neural network-genetic algorithm, a model focusing on a more accurate description of the electron kinetics and density functional theory (DFT) studies, to investigate the reaction mechanisms. Due to the complex chemistry taking place in a DRM, the development of accurate multidimensional models with extensive chemistry is currently restricted by computational limits.

I claim:

1. A method for a conversion of $CO_2$ to non-$CO_2$ products comprising: passing a gas through an industrial heating device wherein the industrial heating device is comprised of at least one element that is electrically connected to a power source thereby generating a thermal plasma plume comprised of a gaseous multi-species fermion and boson flow; bringing the thermal plasma plume into contact with the $CO_2$; and introducing a reducing agent into the thermal plasma plume in contact with the $CO_2$ thereby causing the conversion of $CO_2$ into non-$CO_2$ products, wherein the thermal plasma plume is comprised of energized species that are not fully ionic and wherein the reducing agent is selected from the group consisting of $H_2$ and $CH_4$.

2. The method of claim 1, wherein the non-$CO_2$ products consist of compounds selected from the group of compounds consisting of methanol, ethanol, formic acid, acetic acid, propanoic acid and syngas.

3. The method of claim 1, wherein the energized species are produced by electro-shear plasma and vibro-shear plasma.

4. The method of claim 1, wherein the energized species are energized due to vibrational excitation of molecules.

* * * * *